UNITED STATES PATENT OFFICE.

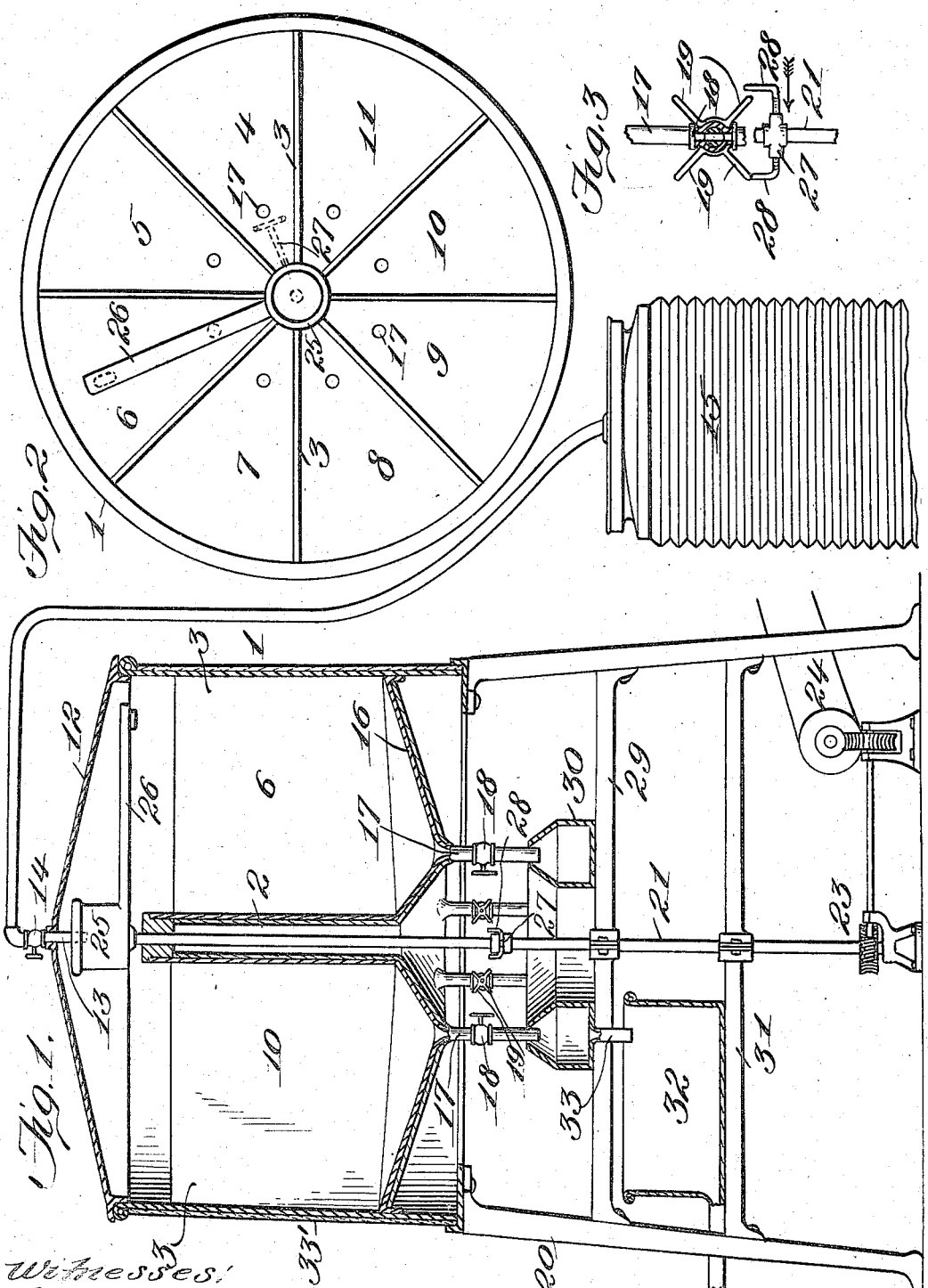

JOSEPH WILLMANN, OF SHELTON, CONNECTICUT.

APPARATUS FOR KILLING BACTERIA IN LIQUIDS.

No. 867,089.  Specification of Letters Patent.  Patented Sept. 24, 1907.

Application filed October 22, 1906. Serial No. 340,042.

*To all whom it may concern:*

Be it known that I, JOSEPH WILLMANN, a subject of the Emperor of Germany, residing at Shelton, in the county of Fairfield and State of Connecticut, have invented new and useful Improvements in Apparatus for Killing Bacteria in Liquids, of which the following is a specification.

This invention relates to an apparatus for killing bacteria in liquids.

It is a fact well known to bacteriologists that when destroying bacteria in liquids by the use of heat, every germ has its own individual temperature at which it is destroyed in a certain length of time. For example, tuberculosis germs are destroyed at 149 degress in fifteen minutes; at 158 degrees in ten minutes; at 176 degrees in five minutes; and at 194 degrees in two minutes. It is also a fact well known to bacteriologists that if a liquid, milk for example, is heated above the boiling temperature 212 Fahr. all bacteria therein are instantly killed, but such treatment destroys certain of the characteristics of the milk. It is furthermore well known by bacteriologists that where milk is heated to a temperature of from 158 to 168 degrees Fahr., its characteristics are not affected, but that unless the milk is held for some time at that temperature all of the bacteria therein are not destroyed. It is furthermore well known that the bacteria in milk can be entirely killed at a temperature of from about 158 to 168 degrees Fahr., if the liquid containing the bacteria is held for a certain period of time at such temperature; for example all bacteria in milk are killed if the milk is held at 158 to 168 degrees Fahr. for say from ten to fifteen minutes.

The object of this invention is to provide an apparatus for holding milk or other liquids heated to a pasteurizing temperature a sufficient period of time to entirely destroy the germ life therein and at the same time preserve the characteristics of the milk or other liquid so that the milk or other liquid will not only be pure and wholesome, but will keep for much longer periods of time than if not pasteurized.

A further object of the invention is to provide an apparatus for treating milk or other liquid to entirely destroy the bacteria whereby the milk or liquid will be automatically received, automatically held for the desired period of time and automatically discharged.

The invention has for its further object to provide an apparatus for treating milk or other liquids for the purpose set forth, which shall be comparatively simple in its construction, automatic in its operation, strong, durable, efficient in its use, conveniently operated and readily set up.

In describing the invention more specifically reference is had to the accompanying drawings which form a part of this specification and wherein is shown an example of an apparatus for the purpose set forth in accordance with this invention, but it is to be understood that changes, variations, and modifications can be resorted to which come within the scope of the claims hereunto appended.

In the drawings wherein like reference characters denote corresponding parts throughout the several views—Figure 1 is a sectional elevation of an apparatus for treating liquids in accordance with this invention. Fig. 2 is a top plan view. Fig. 3 is a detail.

Referring to the drawings by reference characters, 1 denotes a tank having a centrally-disposed hollow tube 2, from which projects a series of radial partitions 3 of a length as to extend to the inner face of the tank. The partitions 3 are fixedly secured at their ends to the tank and tube, are of less height than the height of the tank, and their top edges terminate at a point removed from the top edge of the tank. Although this is the preferred construction in respect to the partitions, yet the partitions can be of any suitable height. These partitions 3 divide the tank into a series of compartments as shown in the drawing, eight in number, and which are indicated by the reference characters 4, 5, 6, 7, 8, 9, 10 and 11. This number of compartments is shown by way of example, for the reason that the number can be increased or diminished according to the quantity of liquid desired to be treated. A conical shaped cover 12 is provided for the tank 1 and which has at the apex thereof an opening provided through which extends a liquid feed pipe 13 having a cut-off 14 above the top of the cover 12. The lqiuid feed pipe 13 communicates with any suitable form of apparatus, as at 15, for heating the liquid to the desired temperature, say from 158 to 168 degrees Fahr.

The bottom of the tank is indicated by the reference character 16 and slopes from the tube and from the wall of the tank and is in the form of a gutter so that the discharge of the liquid from the compartments will be facilitated when occasion so requires. At the bend in the bottom 16 of the tank an outlet pipe 17 for each compartment is secured and each of the said outlet pipes 17 has an automatically-operable closure plug 18, the handle thereof being formed with a plurality of arms 19, preferably four in number, which are adapted to be engaged and actuated by a tripping mechanism for opening and closing the plug. A supporting base 20 is provided for the tank 1.

Extending up through the tube 2 is a shaft 21, which revolves at a predetermined rate of speed through the medium of a motion-transmitting mechanism 23 operated by a prime mover 24, this latter, as well as the mechanism 23, being of any suitable construction. The shaft 21 at its top and above the compartments in the tank carries a receptacle 25, into which opens the feed pipe 14. The receptacle 25 has attached thereto a spout 26 which, as the shaft 21 rotates, is adapted to extend successively over each of the compartments in the tank to fill the compartments with liquid from the receptacle 24.

Carried by and rotatable with the shaft 21 is a tripping member 27 which is positioned below the tank and has a pair of lugs 28 which, when the shaft 21 rotates, successively engage two of the arms 19 of a plug 18, thereby operating the plug to open and close the same. This manner of operating the closure plugs 18 is shown by way of example.

Carried by the supporting base 20 through the medium of the cross-bars 29 is a receiving trough 30, which is common to all the outlet pipes 17, said outlet pipes 17 opening into the receiving trough 30. Arranged in the lower part of the base 20 and supported through the medium of the member 31 is a reservoir 32 into which the liquid is discharged from the trough 30 by means of the outlet pipe 33. From the reservoir 32 the liquid is conducted to a cooler or into cans or any other suitable receptacle or apparatus. In lieu of employing the reservoir 32 the fluid can be conducted from the trough 30 to a cooler or through a regenerative pasteurizer or into cans or any other receptacle or apparatus.

Suitable means is employed to prevent the radiation of heat from the liquid and for such purpose the wall of the tank 1 is lined with asbestos or surrounded by a water jacket so as to retain the liquid in a heated condition. As shown, the tank is provided with a covering of asbestos 33′.

In the drawings, as before stated, is shown eight compartments. It is evident that the number of compartments will vary with the capacity of the machine and with the length of holding the liquid to the high temperature. During the supply of the liquid to the compartments of the tank 1 the shaft 21 is revolving very slowly, according to the time it is desired to hold the liquid at the temperature at which it is delivered to the apparatus. If this time is, for instance, say fifteen minutes, the speed of the shaft will be such as to make one revolution in twenty-four minutes, as it would be necessary to keep the milk or other liquid in five compartments for a period of fifteen minutes and it will have to eventually cause the filling of all of the eight compartments. During the operation of holding the milk or liquid five of the compartments will always be filled, one will be in a filling stage, another empty and the other emptying. It will be assumed that compartments 11, 10, 9, 8 and 7 are filled, compartment 6 filling, compartment 5 empty and compartment 4 emptying. After compartment 6 has been filled and the spout is moved over compartment 5, the tripping device will have closed the outlet to compartment 4 as this compartment will have been emptied by this time. The tripping device will then move to a position to open the outlet of compartment 11. After the filling of compartment 5, the spout is then moved over compartment 4 to cause the filling thereof and the tripping device will close the outlet of compartment 11, which has been emptied by this time and the tripping device will move on to open the outlet to compartment 10 so that said compartment can empty. This operation is continued until the milk or liquid supply is cut off or exhausted and it is evident from such operation that it enables perfect pasteurization of the milk or liquid. It will furthermore be evident that by the apparatus set up as hereinbefore set forth, the liquid is retained automatically at the desired temperature, and automatically discharged and that the operation of perfect pasteurization is a continuous one. It will furthermore be evident that since the liquid is held at the desired temperature for the requisite period of time the bacteria will be entirely eliminated.

Although as shown, the liquid is heated to the pasteurizing temperature in a receptacle which communicates with the apparatus, it is obvious that it can be heated in the tank itself by any suitable means and the liquid held at the desired temperature the necessary length of time.

Although the apparatus is illustrated as embodying a cylindrical compartment tank, yet the tank can be rectangular and provided with a suitable number of compartments. With the rectangular tank can be disposed suitable filling and discharging devices for the compartments thereof, as well as suitable operating means for such devices. It will be understood, however, that the form of apparatus shown is set up by way of example to illustrate one embodiment of the invention.

What I claim is—

1. An apparatus of the character described comprising means for automatically receiving and holding a plurality of charges of liquid in a continuous manner at a pasteurizing temperature a period of time necessary to kill the germs contained in said liquid, and means for automatically and successively discharging the said charges.

2. An apparatus of the character described comprising a tank provided with a plurality of compartments adapted to successively receive a body of liquid heated to a pasteurizing temperature, and means for automatically holding the liquid in each compartment a specified time at such temperature thereby killing the germs in said liquid.

3. An apparatus for killing germs in liquids comprising a tank provided with a plurality of compartments adapted to successively receive a body of liquid heated to a temperature from 158 to 168 degrees Fahr., means for successively filling from a continuous run of liquid heated to such temperature, each of said compartments with the heated liquid, means for holding the liquid at such temperature in each of the compartments for a period of time necessary to kill the germs contained in the liquid, and means for successively discharging the liquid from each of said compartments.

4. An apparatus of the character described comprising a tank provided with a plurality of compartments adapted to contain liquid, a rotatable means adapted to successively supply said compartments with a body of liquid from a continuous run of liquid heated to a pasteurizing temperature, means for retaining the liquid in each of said compartments at such temperature a period of time necessary to kill the germs in the liquid, and means for successively emptying said compartments of the liquid.

5. An apparatus of the character described comprising a tank provided with a plurality of compartments, a rotatable shaft, a receptacle carried by said shaft, means for supplying liquid heated to a pasteurizing temperature to said receptacle, said receptacle provided with an outlet adapted to discharge the heated liquid successively in each of said compartments, and means for successively opening said compartments thereby discharging the liquid therefrom.

6. An apparatus of the character described comprising a tank provided with a plurality of compartments, a rotatable shaft, a receptacle carried by said shaft, means for supplying liquid heated to a pasteurizing temperature to said receptacle, said receptacle provided with an outlet adapted to discharge the heated liquid successively in each of said compartments, means for holding the liquid at such temperature for a period of time thereby killing the germs in the liquid, and means for successively emptying said compartments.

7. An apparatus of the character described comprising a tank provided with a plurality of compartments, a receptacle arranged within the tank and communicating with a liquid supply adapted to successively fill said compartments, a rotatable member carrying said receptacle, a common receiving pipe for the contents of said compartments, an outlet pipe for each of the compartments opening into said common receiving pipe, means for opening and closing the outlet pipes, means carried by the rotatable member for successively actuating the opening and closing means for the outlet pipes, and means for conducting the liquid from said common receiving pipe.

In testimony whereof I have hereunto set my hand in presence of two subscribing witnesses.

JOSEPH WILLMANN.

Witnesses:
 EDW. W. KNEEN,
 GEORGE L. UNWIN.